Nov. 9, 1926. Re. 16,467

C. A. FRIEDRICH

SOCKET FOR VACUUM TUBES OR THE LIKE

Original Filed Dec. 9, 1921

INVENTOR
Charles A. Friedrich,
BY
ATTORNEY

Reissued Nov. 9, 1926.

Re. 16,467

UNITED STATES PATENT OFFICE.

CHARLES A. FRIEDRICH, OF BELLEROSE, NEW YORK, ASSIGNOR TO ALDEN MANUFACTURING COMPANY, OF SPRINGFIELD, MASSACHUSETTS, A CORPORATION OF MASSACHUSETTS.

SOCKET FOR VACUUM TUBES OR THE LIKE.

Original No. 1,505,329, dated August 19, 1924, Serial No. 521,083, filed December 9, 1921. Application for reissue filed August 13, 1926. Serial No. 129,063.

The present invention relates to electric sockets particularly for vacuum tubes used in electric wireless apparatus.

It is well known that the transmission of outside vibrations through the tube socket to the vacuum tube in radio transmitting and receiving devices is very detrimental to the proper functioning of such tubes. If these vibrations are of large amplitude, it is quite possible that the electrodes in the tube may be thrown together, causing short circuits and probably burn-outs of the tube filament or of its associated apparatus. Also, these vibrations, by periodically displacing the elements, change the characteristics of the tube, thus causing modulations in such devices as are used for radio frequency, and direct changes of anode current in those used at audio frequencies, either of which phenomena result in the conversion of mechanical vibrations into audio frequency currents in the output of the system.

Various devices have been constructed to absorb such outside vibrations and shocks but most of such devices are too cumbersome and not sufficiently sensitive. Besides such devices require too much valuable space in wireless apparatus.

In order to overcome these inconveniences, inefficiencies and drawbacks, I have constructed a novel vacuum tube socket which is equipped with means for absorbing outside vibrations, shocks, etc., and which is adapted to occupy comparatively small space.

With this object in view, my invention consists in that, contrary to the existing sockets in which the tube is held substantially non-yielding in the socket, my new socket is provided with shock absorbed combined contacting and holding means which will support the tube so as to hold it yieldingly and out of physical contact with the socket proper, these means largely preventing transmission of mechanical vibration to the tube and its elements.

Figure 1:
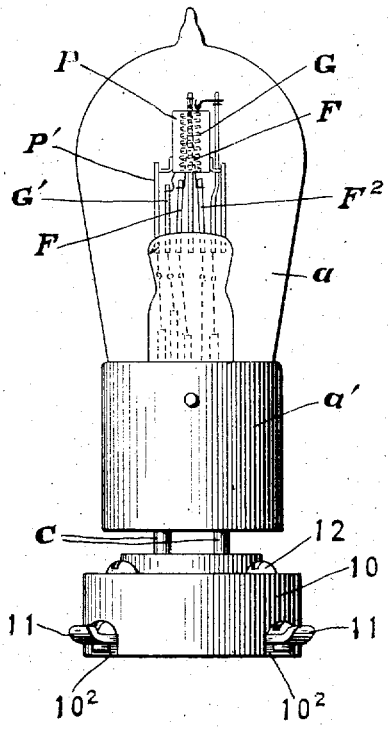
Figure 2:
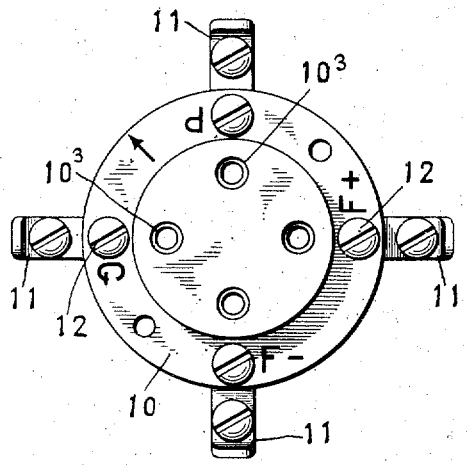
Figure 4:
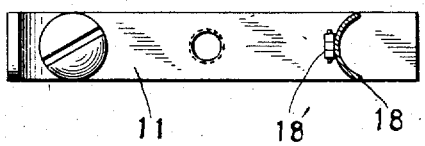
Figure 3:
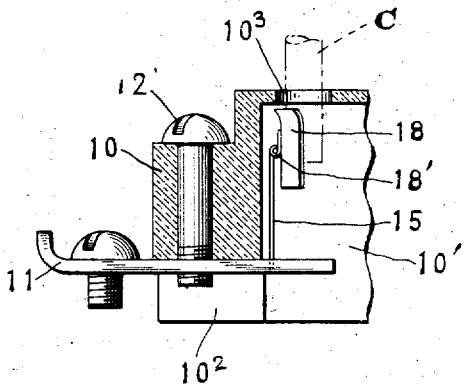

My invention will be more fully understood by reference to the accompanying drawing in which similar reference characters denote corresponding parts and in which, Fig. 1 is an elevation of a vacuum tube equipped with my novel socket; Fig. 2 is an enlarged top plan view of the socket proper; Fig. 3 is an enlarged vertical sectional view of one part of the socket; Fig. 4 is a plan view and section of one of the socket members.

Referring to the drawing more in detail *a* denotes the bulb ordinarily called the vacuum tube and generally used in wireless systems for receiving or sending purposes. In this tube P denotes the so-called plate made in form of a sleeve which encloses the grid G and filament F, the grid, filament and plate being insulated from one another and conductively connected to the leads F′, $F^2$, G′ and P′, which pass through the insulation stem S and connect with wires, W, leading to the contact pins or prongs C projecting from the base or sleeve *a′* of the tube.

In previous constructions of sockets for vacuum tubes, the electric connections between the terminal prongs of the vacuum tube and its associated apparatus have been effected by means of a socket enclosing the base of the tube, said socket being provided with a number of springs adapted to make direct contact with said prongs. Such sockets are usually fixed to a stationary structure such as a panel, panel board frame or receiving set. When the tube is engaged in such a socket, it forms with it a substantially rigid piece so that shocks or vibrations to which the complete apparatus may be subjected are transmitted directly to the elements of the tube. This detrimental effect we have avoided in the following manner.

The base 10 according to this invention, comprises a disk of insulation material hollow as at 10′ and open at its bottom and which is formed in its top with a plurality of perforations $10^3$. At its bottom the disk is formed with radial grooves $10^2$ through which extend metal arms 11 forming the terminals for the electric wires (not shown)

These arms are held in position by screw bolts 12 fixed in the disk. There are as many perforations as there are prongs or pins C, thus in the present case four, and the same arranged to register with and made somewhat wider than the diameter of said prongs, so that the latter may freely pass through said perforations.

Arranged in the hollow 10′ are the contact shoes 18 made according to the structure shown in Figs. 3 and 4. These shoes 18 are hinged at the point 18′ to the resilient supporting spring 15 which in turn is secured to the metal arm 11 within the hollow 10′. Upon insertion of the tube the shoes 14 are displaced radially away from the center of the socket thus bending the spring 15 which in turn applies forces to the socket pins C. The vacuum tube will naturally assume a position in which the summation of these forces is equal to zero and when this position is assumed the tube will be held free and clear and movable universally in all directions from the base 10.

Owing to the flexible support of the contact members such as the shoes 18 the engagement of the prongs C therewith will be ensured even though the latter may be of improper spacing or size due to some fault in the manufacture or to having been accidentally bent.

The base $a'$ is usually provided with a pin or projection K. This pin is utilized in the present construction of the socket to facilitate the positioning of the vacuum tube relative to the socket 10. On the upper face of the socket an arrow (see Fig. 2) is marked indicating the position of the pin K when inserting the tube, so that the wires may be properly connected to the corresponding electrodes. The latter may be marked, as shown, on the disk opposite the terminals.

The top of the insulating disk 10 serves as a positive stop for the base $a'$ of the vacuum tube in case the contacts fail to limit the insertion of the prongs. The said top plate also serves to limit the lateral tilting action of the tube either by the engagement of the prongs C with the sides of the prong openings $10^3$ or by the engagement of the base $a'$ of the tube with the outer edge of the insulating disk. The insulating top piece with the holes $10^3$ also serves as a guide for the prongs or pins C when inserting the same to the contacts and prevents undue twisting of the tube and contacts.

There may be other modifications made by those skilled in the art without departing from the principle of my invention. I, therefore, do not wish to restrict myself to the details shown and described.

The invention is broadly claimed in my concurrent reissue application No. 129,061.

I claim:—

1. A shock absorbing socket for vacuum tubes having projecting prongs comprising an insulating base, a plurality of metallic arms secured to said base and arranged spaced apart circumferentially and insulated from each other and each provided with a circuit terminal, a spring upright supported by each of said arms, and a contact carried by each spring upright, said contacts being movable independently of each other so that they can accommodate themselves to various sizes and positions of prongs and all of said contacts and their supporting uprights being movable angularly together to a limited extent when the prongs of a vacuum tube are held by said contacts.

2. A socket for vacuum tubes having projecting prongs comprising in combination an insulating member, four independent electric conductor elements insulated from each other, each of said elements having a flat arm portion secured to said insulating member in a plane substantially parallel to the bottom of said member and each of said elements having an upright spring portion terminating in a contact piece at an angle to the arm portion and movable independently thereof and adapted to engage the side of one prong of a tube and so that when a tube is inserted said four contact pieces exert a relatively strong contact pressure on the sides of the tube prongs, and an insulating top having perforations to receive the prongs of the tube and serving as a guide for the contacts and upright spring portions.

3. A shock absorbing socket for vacuum tubes having projecting prongs comprising an insulating base, terminals secured thereto, a socket for connecting each prong to a terminal, each socket including a spring arm portion and a resilient contact member yieldable independently to accommodate itself to different prongs, said sockets all being resiliently movable together when the prongs of a vacuum tube are inserted.

4. A shock absorbing socket for vacuum tubes having projecting prongs, comprising an insulating base having apertures registering with said prongs, the walls of said apertures functioning as a stop to limit twisting of said tube, terminals secured to said base, a contacting member for connecting each prong to a terminal, each contacting member including a spring arm portion and a resilient contact member yieldable independently to accommodate itself to different prongs, said contacting members being resiliently movable when the prongs of the vacuum tube are inserted.

5. A shock absorbing socket for vacuum tubes having projecting prongs comprising an insulating base, said base forming a stop limiting the depth of insertion of the tube and also limiting the tilting of the tube after the insertion, terminals secured thereto, a contacting member for connecting each prong to a terminal, each contacting member including a spring arm portion and a resilient contact member yieldable independently to accommodate itself to different prongs, said contacting members being resiliently movable when the prongs of the vacuum tube are inserted.

6. In a socket for a vacuum tube having projecting prongs, an insulating base, terminal members fixed to said base, universally yielding spring members conductively connected to said terminal members, contacting shoes hinged to the upper end of said spring members and adapted to engage said prongs so as to support the vacuum tube out of physical contact with said base and means for limiting the extent to which the prongs of a tube can be inserted.

7. In a socket for a vacuum tube having projecting prongs, an insulating base having four perforations in its top arranged to receive the four prongs of the tube, terminal members below said perforations, universally yielding spring members supported vertically by said terminal members, contacting shoes hinged to the tops of said spring members, registering with said perforations and adapted to engage said prongs so as to support the vacuum tube out of physical contact with said base and means for limiting the angular displacement of the vacuum tube when inserted in said socket.

8. A vacuum tube socket comprising an insulating base, more than two conducting members secured to said base and spaced apart circumferentially thereof and insulated from each other, each conducting member having a spring arm portion and a contact portion for yieldingly supporting a tube out of contact with the base, the spring arm portions of said conducting members all pressing radially of the socket to apply a binding force upon the prongs of the tube without tending to rotate the tube.

9. A vacuum tube socket comprising an insulating base, conducting members secured to said base and spaced apart circumferentially thereof and insulated from each other, each conducting member having a spring arm portion and a contact portion for yieldingly supporting a tube, a top piece having perforations to admit the prongs of a tube to engage said contact members, the spring arm portions of said conducting members all pressing radially of the socket to apply a binding force upon the prongs of the tube without tending to rotate the tube, said top piece serving as a stop to limit the insertion of the tube prongs.

10. A shock absorbing socket for vacuum tubes having projecting prongs comprising an insulating base, four conducting members, each conducting member consisting of an anchorage portion, a contact portion and a spring arm portion secured thereto for yieldingly supporting the tube, the contact portion and arm of each member being yieldable independently of the others to accommodate themselves to different prongs and different spacings of prongs, and all being resiliently movable together when the prongs of a vacuum tube are in place, said contacts pressing against the sides of the prongs to hold them in place.

11. A shock absorbing socket for vaccuum tubes having four projecting prongs, comprising an insulating base having four spaced apertures for receiving the prongs, the walls of said apertures functioning as a stop to limit movement of said tube, conducting members secured to said base and having terminals and contacting members for connecting the prongs to the terminals, each contacting member including a spring arm portion and a resilient contact member yieldable laterally and independently of the others to accommodate it to different sizes of prongs, all of said contacting members being resiliently movable together when the prongs of a vacuum tube are in place.

12. A shock absorbing socket for vacuum tubes having projecting prongs comprising an insulating base with a perforated top and having a recess, said base and top forming a stop limiting the depth of insertion of the tube and also limiting the tilting of the tube after the insertion, terminals secured to the base, a contacting member in said recess for connecting each prong to a terminal, each contacting member including a spring arm portion and a resilient contact member yieldable laterally independently to adapt it to the side of a tube prong, said contacting members being resiliently movable when the prongs of the vacuum tube are inserted through the top.

CHARLES A. FRIEDRICH.